United States Patent [19]

Nolen et al.

[11] Patent Number: 5,799,436

[45] Date of Patent: Sep. 1, 1998

[54] APPARATUS FOR ATTRACTING AND DESTROYING INSECTS

[75] Inventors: James A. Nolen, West Greenwich, R.I.; William Mallow, Helotes, Tex.

[73] Assignee: Biosensory Insect Control Corporation, Groton, Conn.

[21] Appl. No.: 633,887

[22] Filed: Apr. 17, 1996

[51] Int. Cl.⁶ ................................................ A01M 1/22
[52] U.S. Cl. ................................................ 43/112
[58] Field of Search .......................... 43/112, 107, 132.1

[56] References Cited

U.S. PATENT DOCUMENTS

| | | | |
|---|---|---|---|
| 2,106,528 | 1/1938 | Jones et al. | 43/112 |
| 3,187,458 | 6/1965 | Densmore | 43/113 |
| 3,835,577 | 9/1974 | Soulos | 43/112 |
| 3,894,352 | 7/1975 | Iannini | 43/112 |
| 4,182,069 | 1/1980 | De Yoreo | 43/112 |
| 4,387,529 | 6/1983 | Hedstrom | 43/112 |
| 4,907,366 | 3/1990 | Balfour | 43/132.1 |
| 5,205,064 | 4/1993 | Nolen | 43/112 |
| 5,382,422 | 1/1995 | Dieguez et al. | 43/111 |
| 5,595,018 | 1/1997 | Wilbanks | 43/112 |

FOREIGN PATENT DOCUMENTS

| | | | |
|---|---|---|---|
| 92/17060 | 10/1992 | WIPO | 43/112 |
| PCT/AU92/ 00137 | 10/1992 | WIPO. | |

*Primary Examiner*—Joseph J. Hail, III
*Attorney, Agent, or Firm*—Salter & Michaelson

[57] ABSTRACT

An apparatus for attracting and destroying insects includes a housing, a canister secured to the housing and containing carbon dioxide, and a discharge device for discharging the carbon dioxide from the canister and into the housing. The apparatus further includes a source of octenol provided in the housing, and a device for introducing and mixing the octenol with the carbon dioxide within the housing. The mixture of carbon dioxide and octenol is released from the housing for attracting insects. A heat source is also provided for further attracting insects, and an electric grid secured to and surrounding the housing destroys the insects upon their contacting the grid.

2 Claims, 4 Drawing Sheets

APPARATUS FOR ATTRACTING AND DESTROYING INSECTS

BACKGROUND AND SUMMARY OF THE INVENTION

The present invention relates generally to apparatus for attracting and destroying insects, and more particularly to an apparatus which utilizes carbon dioxide, octenol (1-octen-3-ol) and heat in combination to attract insects, including mosquitoes, biting flies and midges.

Devices for attracting and destroying insects are well-known in the art. For example, U.S. Pat. Nos. 2,106,528 to Jones et al., 3,187,458 to Densmore, 3,835,577 to Soulos, 3,894,351 to Iannini, 4,182,069 to DeYoreo, and 4,387,529 to Hedstrom are representative of the available prior art. The patent to Densmore discloses a device which employs a light for attracting insects and a pesticide saturated mesh surrounding the light for killing the insects attempting to reach the light source. The remaining patents to Jones et al., Soulos, Iannini, DeYoreo and Hedstrom disclose various devices which employ an illuminating and/or odor dispensing mechanism for attracting insects, and an electrified screen grid for electrocuting insects attempting to reach the light or pheromone.

Although the electric "bug zapping" devices are popular with consumers, they have certain shortcomings. For example, the devices employing an ultraviolet light source are effective for attracting and destroying beneficial insects but are ineffective for attracting biting insects, such as mosquitoes and flies, that prey on humans and livestock. The prior art devices which utilize pheromones as the odor source to attract specific types of insects are expensive because the pheromone source is continuously active and therefore must constantly be replaced.

One solution to the foregoing problems is provided in U.S. Pat. No. 5,205,064 to Nolen, which is assigned to the present assignee. This patent discloses a device having a pressurized canister charged with carbon dioxide, octenol, or both, or with insect pheromones. The device further has an infrared and/or ultraviolet light source which is surrounded by an electric grid.

In mosquitoes, which prey primarily on humans and livestock, olfactory structures guide the flight of these insects along the carbon dioxide plume of their hosts' respiration. The plume also contains kairomones, a collective term for the chemical components of the respiration and body odor. Even minute concentrations of kairomones and carbon dioxide are powerful long-range attractants. The mosquito can detect these attractants with their olfactory structures up to 90 meters away. Then these insects can visually locate the host at a distance of ten meters. Since their compound eyes cannot resolve small features, they use sensitive thermal receptors to attack the host. More specifically, the receptors guide the insect to its host and locate areas of high blood density near the surface of the skin from a distance of about three meters away.

Insects, such as mosquitoes, locate hosts through a combination of chemicals characteristic of the animal host. When one component of this chemical signature is present without others, its effectiveness as an attractant is greatly diminished. For example, a great amount of carbon dioxide combined with no octenol is ineffective since no animal exhibits these characteristics. The mosquito catch for either CO2 or octenol alone increases six-fold when the two are combined, and another three-fold increase results from adding the proper infrared signature. The present invention uses a combination of attractants including carbon dioxide, octenol and heat to effectively and economically attract and destroy these insects without the use of pesticides.

Accordingly, among the several objects of the present invention are the provision of an apparatus which is particularly effective in attracting and destroying insects, such as mosquitos; the provision of such an apparatus which is not harmful to the environment; the provision of such an apparatus which simulates the respiration and temperature of a host animal and which can simulate a variety of host animals; the provision of such an apparatus which can attract many species of insects upon varying the insect attracting components of the apparatus; and the provision of such an apparatus which is relatively simple in design, easy to install and economical to operate.

The present invention is directed to an apparatus for attracting and destroying insects comprising a housing, a canister secured to the housing and containing carbon dioxide, and means for discharging the carbon dioxide from the canister and into the housing. The apparatus further comprises a source of octenol provided in the housing and means for introducing and mixing the octenol with the carbon dioxide within the housing. The mixture of carbon dioxide and octenol is released from the housing for attracting insects. A heat source is also provided for further attracting insects, and an electric grid secured to and surrounding the housing destroys the insects upon their contacting the grid.

In one embodiment of the present invention, the introducing and mixing means comprises a solution of octenol in specialty formulated wax-like substance. The density of the wax is formulated to release an amount of gaseous octenol preferred by the targeted insect species through evaporation at ambient temperatures. The octenol mixes with the discharged carbon dioxide in the housing. Octenol emissions in excess of 4 mg per hour are difficult to obtain through evaporation, but are preferred by most pest species. To achieve these emission levels the molecular weight of the wax is adjusted or the surface area of the wax is increased by saturating a porous, sponge-like material with the octenol-wax solution. In another preferred embodiment, the introducing and mixing means comprises a container containing an aqueous octenol solution wherein the container has an opening for releasing gaseous octenol from the container. The introducing and mixing means further comprises a venturi in fluid communication with the opening of the container. The venturi is in fluid communication with the discharged carbon dioxide for mixing the carbon dioxide with the octenol.

Preferably, the heat source comprises a light trap structure secured within the housing and an incandescent bulb disposed within the light trap structure. The light trap structure has a plurality of walls with reflective and non-reflective interior surfaces wherein the non-reflective interior surfaces of the walls absorb heat generated by the bulb. The heat absorbed by the walls creates an irregular heat pattern which represents a living thing. The heat generated from the heat source corresponds to the level of mixed carbon dioxide and octenol for resembling a living thing.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

Corresponding reference numerals designate corresponding parts throughout the several views of the drawings.

DETAILED DESCRIPTION OF THE PREFERRED EMBODIMENTS

There are over 3,000 species of mosquitos. Not all species prey on mammals. However, those that do are attracted to carbon dioxide and octenol. It has been recently discovered that the olfactory organs of the mosquito at the base of its antennae have a carbon dioxide receptor. It has been further discovered that the greater the emission of carbon dioxide, the greater number of mosquitos are attracted to the source.

Octenol is also a mosquito attractant. Octenol is an alcohol produced by fermentation. Cows and other livestock produce octenol when plant material ferments in their stomachs. Molds and fungi, including edible mushrooms, also produce octenol. Tests have been conducted which demonstrate that using carbon dioxide alone is not as effective in attracting mosquitos as using a combination of carbon dioxide and octenol.

Carbon dioxide and octenol emissions simulate an animal's respiration plume, and are most effective when accompanied by thermal emissions consistent with an animal of sufficient size to generate the respiration plume. Mosquitos are extremely sensitive to the thermal emissions of their host. Thus, a device capable of generating thermal radiation corresponding to a relatively small animal, such as a rabbit, must also emit a mixture of octenol and carbon dioxide which matches a small animal, and not that of a large animal, such as a cow. Moreover, since living things produce irregular heat emissions in that warm areas of the body emit more heat than cooler areas, it is desirable to be able to produce an irregular heat pattern. Mosquitoes have thermoreceptors at the tip of their antennae capable of detecting temperature changes as small as 0.05 degrees Celsius. In fact, their thermoreceptors are so sensitive that they are capable of detecting thermal eddies generated from warm-blooded animals as they walk.

Figure 1:
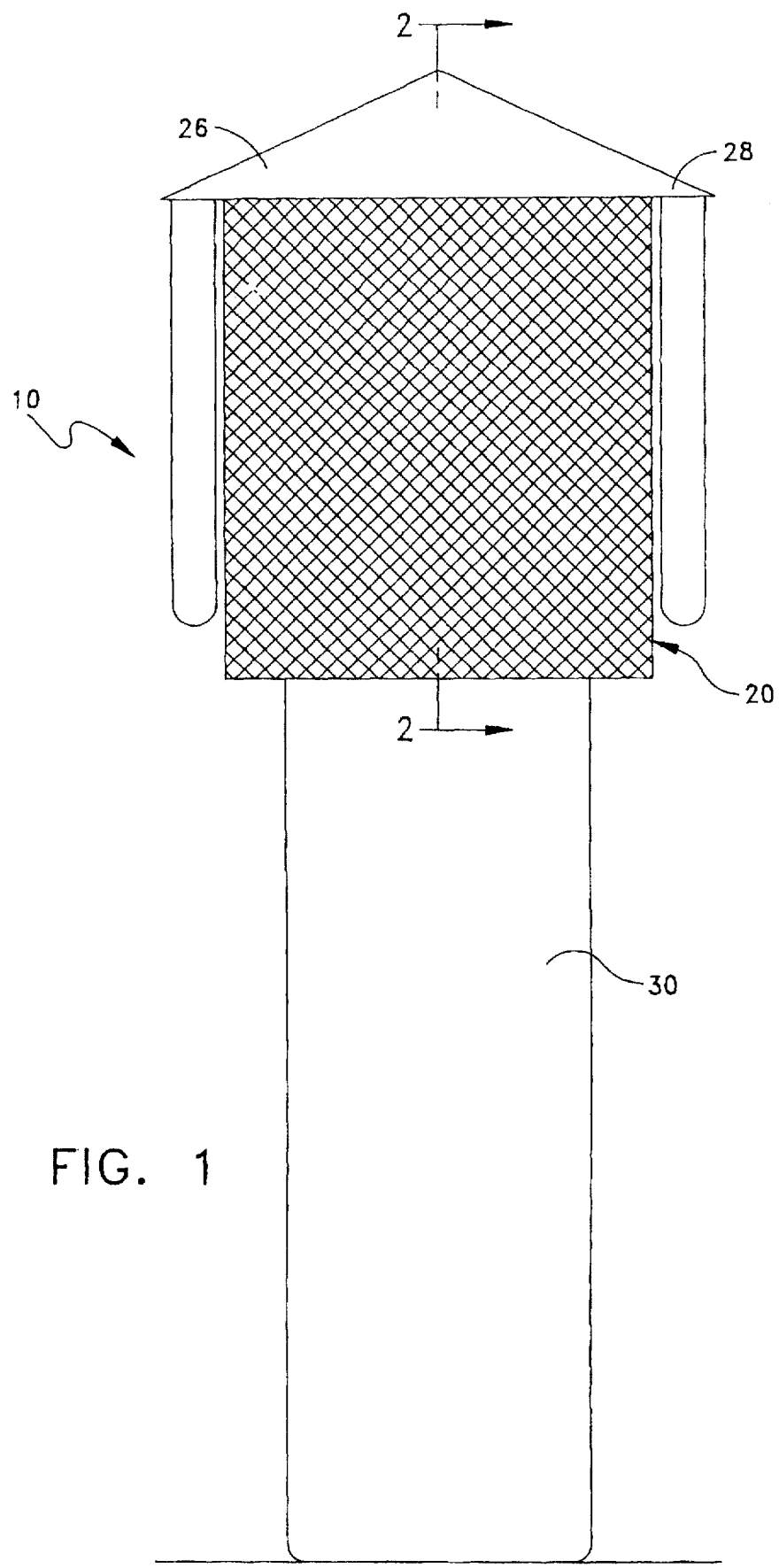
FIG. 1 is an elevational view of an apparatus for attracting and destroying mosquitos of the present invention.
Figure 2:
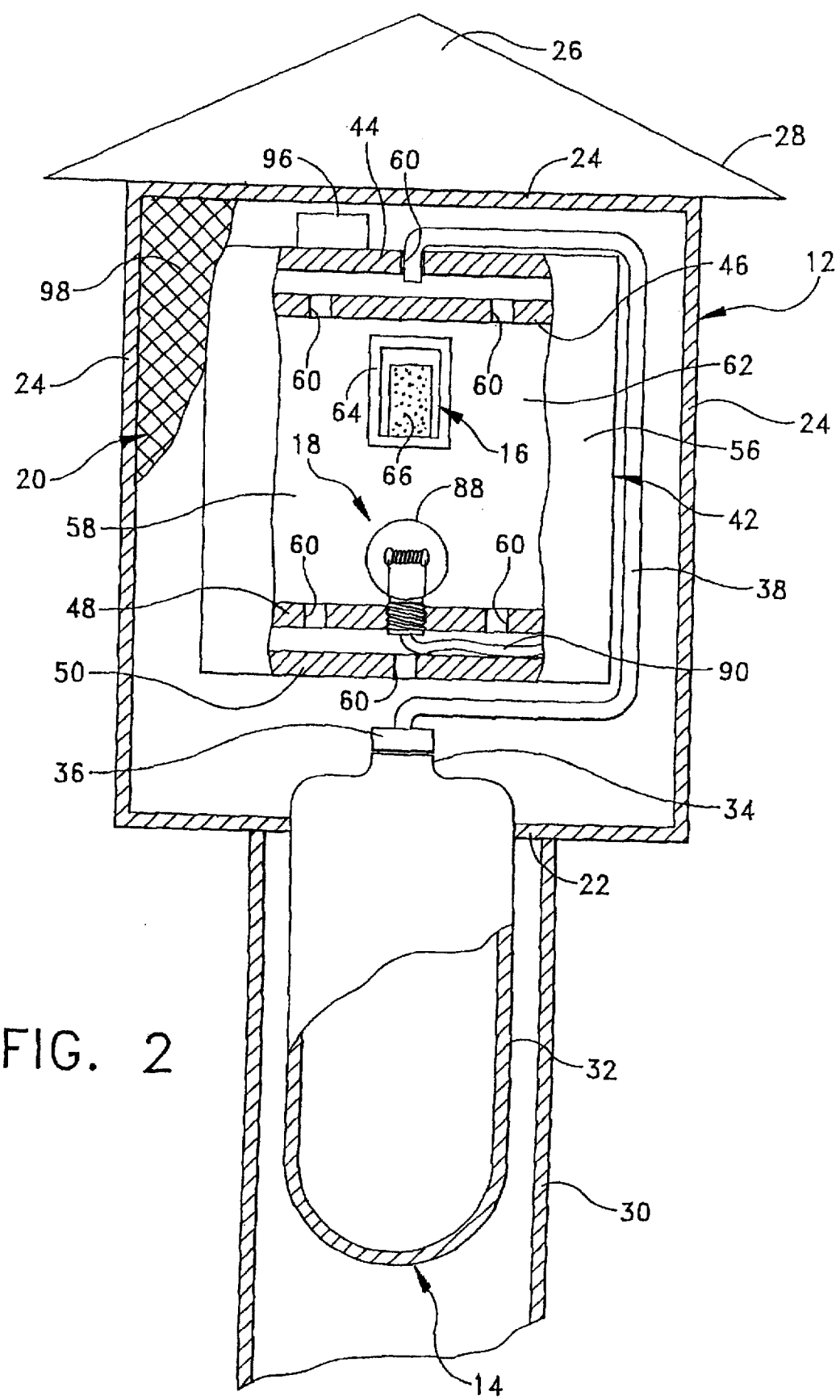
FIG. 2 is a cross sectional view taken along line 2—2 of FIG. 1.

Referring now to the drawings, and more particularly to FIGS. 1 and 2, there is generally indicated at 10 an apparatus for attracting and destroying insects, such as mosquitos and biting flies, which incorporates the foregoing discoveries for attracting insects. The apparatus 10 is operable for attracting and destroying a variety of different insects including mosquitos, biting flies and midges which prey on humans and livestock. The apparatus 10 comprises a housing generally indicated at 12, a pressurized canister generally indicated at 14, a source of octenol generally indicated at 16, a heat source generally indicated at 18, and an electric grid generally indicated at 20.

Referring to FIG. 2, the housing 12 is preferably fashioned from a rugged and durable material suitable for extended outside exposure. The housing 12 comprises a bottom tray 22 having an opening (not designated) formed therein for receiving the canister 14, side and top frame members and/or side walls each designated 24 for supporting the electric grid 20, and a top cover 26 having an outer peripheral edge 28 which overlies the bottom tray 22 and side and top frame members 24. The housing 12 is constructed in a conventional manner wherein the electric grid 20 extends upwardly from bottom tray 22 and the top cover 26 is releasably attached to the upper edge portions of the housing 12, so that the canister 14 and other components disposed within the housing 12 are easily accessible and replaceable. The electric grid 20 is positioned to substantially surround the housing 12. As shown, the housing 12 is supported by a post 30 which is hollow so that the canister 14 can extend within the post 30 for protecting and concealing it.

Figure 3:
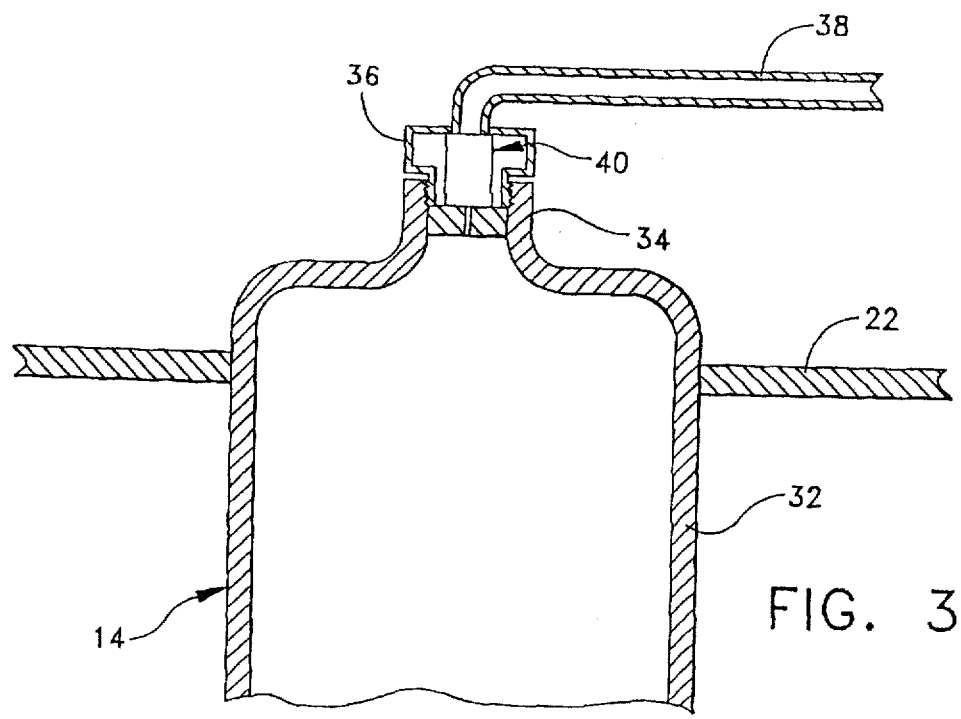
FIG. 3 is an enlarged cross sectional view of a canister of the apparatus.

Turning to FIGS. 2 and 3, the canister 14 is a conventional gas pressurized canister which is charged with carbon dioxide. Carbon dioxide canisters are commercially available for different applications and are readily available. The canister 14 is mounted on the bottom tray 22 of the housing 12 in any suitable manner and comprises a generally cylindrical wall 32 which tapers at its upper end to form a spout 34. A valve 36 is threadably secured to the spout 34 and is in fluid communication with a line 38 which runs to the top of the housing 12 as shown in FIG. 2. A spring-loaded discharge device, generally designated by reference numeral 40 and broadly referred to as "discharging means" (see FIG. 3), which is operable by a solenoid or other actuating means, is disposed within the valve 36 for periodically, or upon command, discharging the carbon dioxide from the canister 14 and into the housing 12 via line 38. Such devices 40 are well-known in the art. Alternatively, the discharging means can embody the rotary cam mechanism disclosed in the aforementioned U.S. Pat. No. 5,205,064 to Nolen, which is incorporated herein by reference, for introducing the carbon dioxide into line 38.

Figure 4:
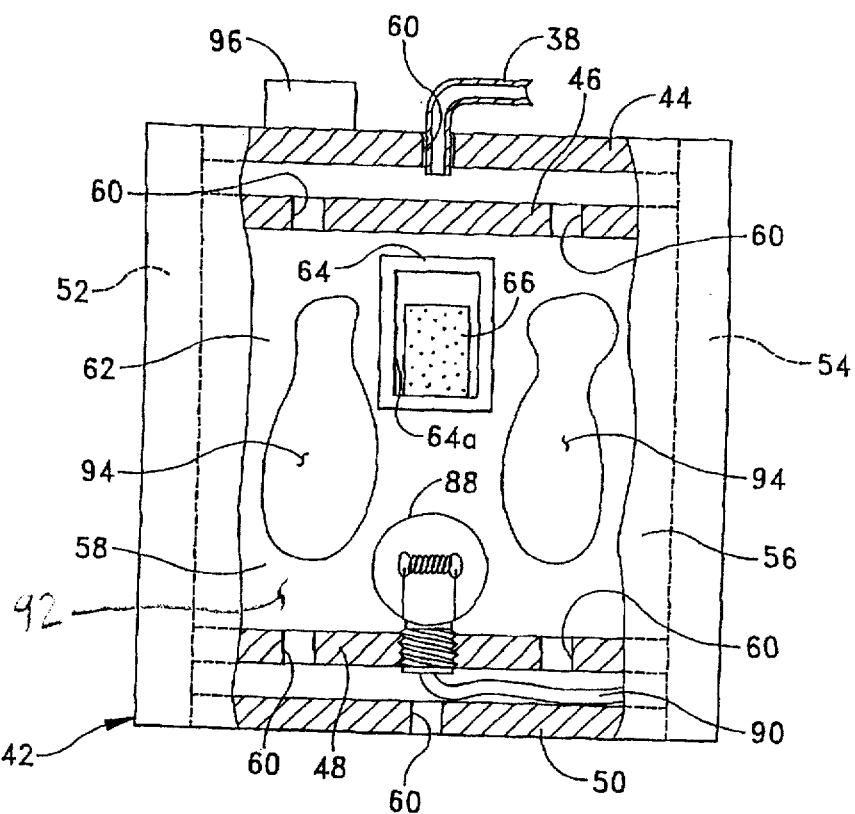
FIG. 4 is an enlarged elevational view with portions removed of a light trap structure of the apparatus.

Turning new to FIG. 4, the housing 12 supports an internally mounted light trap structure generally indicated at 42 which is suitably secured to the bottom tray 22 or the side and top frame members 24 within the housing 12. The light trap structure 42 includes four horizontally disposed walls 44, 46, 48 and 50 and four vertically disposed side walls 52, 54, 56 and 58 which are suitably secured to the horizontal walls. The light trap may be cylindrical in shape. Preferably, the walls of the light trap structure 42 are fabricated from heat conductive material. As shown, the upper end of line 38 extends through an opening 60 formed in the uppermost horizontal wall 44 of the light trap structure 42 for discharging carbon dioxide into the internal chamber 62 of the light trap structure 42. Suitable openings, also designated 60, are formed in the other horizontal walls 46, 48 and 50 of the light trap structure 42 for allowing the discharged carbon dioxide to freely pass in and out of the light trap structure 42.

Referring to FIGS. 2 and 4, the source of octenol 16 is secured to wall 58 of the light trap structure 42 by a cabinet-like formation 64 which defines an inner compartment 64a. As shown, means for mixing and introducing the octenol within the light trap structure 42 of the housing 12 comprises a wax medium 66 containing octenol which is placed within the compartment 64a of the cabinet 64. The density and surface area of the wax medium 66 are engineered to release desired amounts of gaseous octenol at ambient temperatures to mix with the discharged carbon dioxide in the light trap structure 42. The gaseous octenol mixes with the carbon dioxide introduced within the chamber 62 of the light trap structure 42 for creating an insect attracting plume which is released from the structure 42 through the openings 60 in the horizontal walls 44, 46, 48 and 50. Computer models of 1.5 million mosquitoes and midges captured during 1995 field trials indicate the range of octenol emissions below are optimal for the four major pest species in the southeast United States.

Combined with 20 cm$^3$ per minute carbon dioxide and 15 Watt heat source producing 43° C. surface temperatures on a rabbit-sized visual target, the values for octenol are:

| culex nigripalpus | trace |
|---|---|
| ades taeniorhyncus | 13.5 mg/hr |
| mansonia spp | 6.8 mg/hr |
| culicoides furens | 13.5 mg/hr |

Figure 5:
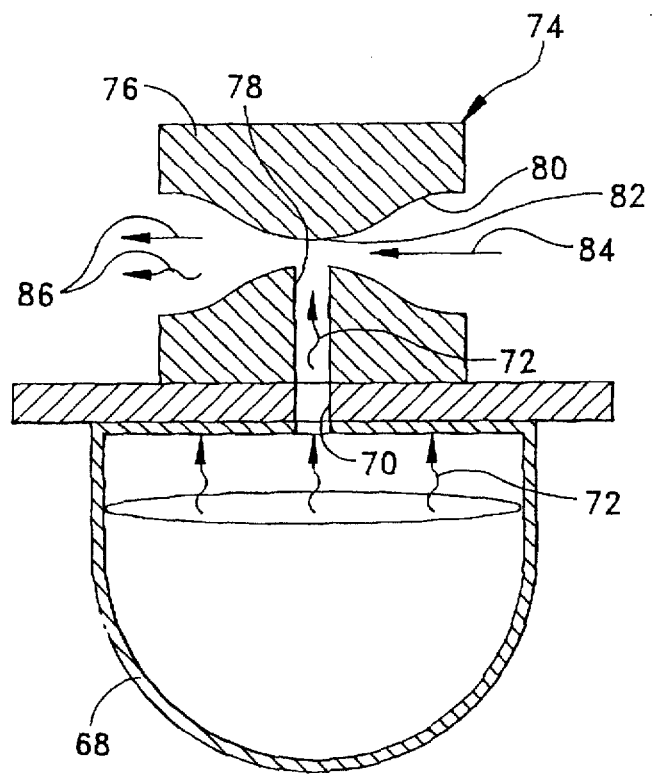
FIG. 5 is an enlarged cross sectional view of a container and venturi for mixing octenol with carbon dioxide discharged from the canister.

FIG. 5 illustrates another preferred method of mixing octenol for large emissions of carbon dioxide. As shown, a container 68 is provided for containing an aqueous octenol solution, the container 68 being suitably mounted on one of the horizontal walls of the light trap structure 42. An opening 70 is formed in the top wall of the container 68 and in the horizontal wall for allowing gaseous octenol and water vapor, represented by lines 72, to escape from the container 68. A venturi, generally indicated at 74, is disposed above the container 68. The venturi 74 has body portion 76 with a vertical bore 78 which is in fluid communication with the opening 70 of the container 68 and the wall for allowing gaseous octenol and water vapor 72 to pass through the venturi 74. The venturi 74 further includes a cross bore 80 having a reduced diameter portion at 82 which is in fluid communication with the vertical bore 78. The arrangement is such that gaseous carbon dioxide, represented by lines 84, within the chamber 62 of the light trap structure 42 passes through the cross bore 80 and mixes with the gaseous octenol and water vapor 72 at the reduced diameter portion 82 of the cross bore 80 for mixing the octenol with the carbon dioxide which is represented by lines 86. The operation and use of the venturi 74 for mixing gases is well-known in the art.

Figure 6:
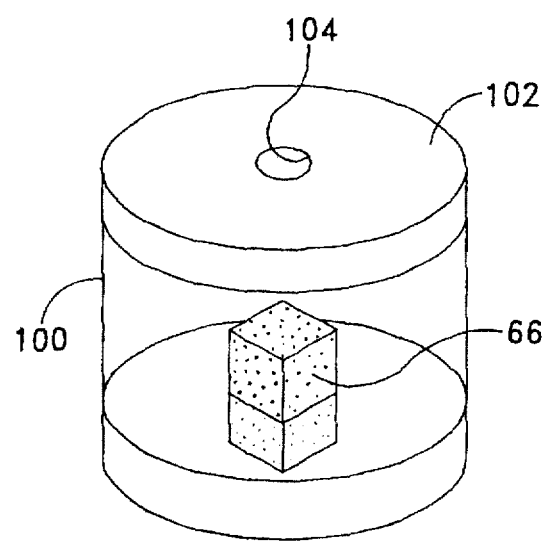
FIG. 6 is a perspective view illustrating the making of the preferred octenol release method of the present invention.

Turning to FIG. 6, there is illustrated a wax-octenol solution in a container 100. In this embodiment, the container 100 itself can be placed within the cabinet 64 wherein the container's lid 102 has an opening 104 which is of a predetermined size for allowing octenol to escape from the container 100. It should be noted that other attractants can be used in place of octenol.

Referring back to FIGS. 2 and 4, the heat source 18 comprises an incandescent or infrared bulb 88 disposed in the light trap structure 42. As shown, the bulb 88 is threadably secured within a socket (not shown) provided within the wall 48 of the light trap structure 42. A cord 90 electrically connects the bulb 88 to a power source (not shown) in a suitable manner. Since the bulb 88 is disposed within the chamber 62 of the light trap structure 42, any light emitted by the bulb 88 is contained therein. Thus, the bulb 88 functions solely to generate heat for further attracting insects and not as a light attractant. Ninety percent of the energy emitted by the incandescent bulb 88 is in infrared wavelengths and ten percent is in wavelengths of visible light. The light trap structure 42 converts the energy in the form of visible light to infrared wavelengths. The arrangement is such that the walls of the light trap structure 42 absorb energy generated by the light and the conductive nature of the walls enables them to radiate heat. Preferably, the heat source heats the walls of the light trap structure 42 to a temperature range of 100 degrees to 110 degrees Fahrenheit with 110 degrees Fahrenheit being optimal. The temperature of the walls can be controlled by regulating the amount of heat generated by the bulb 88, or by changing the size of the bulb 88. The amount of heat generated by the bulb 88 should correspond to the level of mixed carbon dioxide and octenol 86 for resembling a living thing. For example, the level of carbon dioxide and octenol for a relatively large animal, such as a cow, requires a greater amount of heat generated by the power source 18.

Preferably, the exterior surfaces of the light trap structure 42 are painted black for providing a dark target which is particularly attractive to insects. Dark, vertical targets are more effective against mosquitos, whereas dark, horizontal targets are more effective against biting flies. It should be understood that any dark color will be effective as a visual target, however, black is the color that absorbs and radiates energy most rapidly.

The walls of the light trap structure 42 have reflective and non-reflective interior surfaces which are indicated at 92, 94, respectively. The non-reflective surfaces 94 absorb heat generated by the bulb 88 for generating an irregular heat pattern which closely resembles a living thing. As stated above, mosquitos and other similar insects are capable of differentiating between uniform and non-uniform heat patterns and are attracted to non-uniform heat sources. The reflective and non-reflective surfaces 92, 94 can be achieved by painting the inner surfaces of the walls of the light trap structure 42 with appropriate reflective and non-reflective paint (e.g., white and black paint, respectively).

The electric grid 20 is powered by a high voltage electrical transformer 96 (FIGS. 2 and 4) mounted on the top horizontal wall 44 of the light trap structure 42. It comprises an outer mesh screen 98 and an inner mesh screen (not shown) which is secured to the housing 12 in the same fashion as the electrified grid disclosed in the aforementioned patent to Nolen. The outer and inner screens are spaced by a distance which is determined in conjunction with the voltage output of the transformer 96 so as to prevent spark discharge from the screens until an insect enters the space therebetween. The high voltage output lead of the transformer 96 is connected to the inner screen to provide an elevated electrical potential to the grid 20. The other lead from the transformer 96 is connected to the outer screen 98 where it is grounded to the housing 12. The electric grid 20 surrounds the centrally mounted canister 14 and light trap structure 42 so that the insects will be destroyed as they attempt to reach the sources of the heat and chemical attractants.

As the insect passes through the electric grid, it is destroyed by a very brief pulse of electricity. The pulse kills the insect, but does not cause it's exoskeleton to explode, so no insect-fragments are discharged into the air, making the unit safe for use in clean environments such as food processing. The insect falls from the grid during the interval between pulses.

Although not shown, there are a number of electrically operated components which enable the apparatus 10 to more effectively and efficiently operate. For example, a photo cell can be mounted thereon for enabling the apparatus to activate one hour before sunset. A timer can also be provided for activating the apparatus, or for controlling the operation of the discharge means which discharges the carbon dioxide into the light trap structure. Moreover, fluorescent ultra violet lights (as illustrated in FIG. 1) can be mounted on the apparatus for attracting other varieties of night flying insects.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An apparatus for attracting and destroying insects comprising:

a housing;

a canister secured to the housing and containing carbon dioxide;

means for discharging the carbon dioxide from the canister and into the housing;

a source of octenol, separate from the canister containing carbon dioxide, provided in the housing;

means for introducing and forming a mixture of the octenol and the carbon dioxide within the housing, said mixture of octenol and carbon dioxide being released from the housing to attract insects, said introducing and mixture forming means comprising a wax medium containing octenol, said medium having a porous exterior for allowing gaseous octenol to escape and mix with discharged carbon dioxide in the housing;

a heat source for further attracting insects; and an electric grid secured to and substantially surrounding said housing, for destroying insects upon their contacting the grid.

2. An apparatus for attracting and destroying insects comprising:

a housing;

a canister secured to the housing and containing carbon dioxide;

means for discharging the carbon dioxide from the canister and into the housing;

a source of octenol, separate from the canister containing carbon dioxide, provided in the housing;

means for introducing and forming a mixture of the octenol and the carbon dioxide within the housing, said mixture of carbon dioxide and octenol being released from the housing to attract insects, said introducing and mixture forming means comprising a container for containing an aqueous octenol solution, said container having an opening for releasing gaseous octenol and water vapor from the container, and a venturi in fluid communication with the opening of the container, said venturi being in fluid communication with said discharged carbon dioxide for mixing the carbon dioxide with the octenol;

a heat source for further attracting insects; and an electric grid secured to and substantially surrounding said housing, for destroying insects upon their contacting the grid.

* * * * *

UNITED STATES PATENT AND TRADEMARK OFFICE
Certificate

Patent No. 5,799,436                                          Patented: September 1, 1998

On petition requesting issuance of a certificate for correction of inventorship pursuant to 35 U.S.C. 256, it has been found that the above-identified patent, through error and without deceptive intent, improperly sets forth the inventorship.
   Accordingly, it is hereby certified that the correct inventorship of this patent is: James A. Nolen, West Greenwich, RI; William Mallow, Helotes, TX; Daniel Kline, Gainesville, FL.

Signed and Sealed this Twenty-fourth Day of April, 2001.

*JOSEPH J. HAIL, III*
*Supervisory Patent Examiner*
Art Unit 3723